(12) United States Patent
Bottazzi

(10) Patent No.: US 8,708,350 B2
(45) Date of Patent: Apr. 29, 2014

(54) WHEELED STRUCTURE FOR HANDLING AND FITTING PANELS OR PLATES

(75) Inventor: Marc Bottazzi, Saint Vincent de Boisset (FR)

(73) Assignee: M.B.H. Development, Saint Romain la Motte (FR)

( * ) Notice: Subject to any disclaimer, the term of this patent is extended or adjusted under 35 U.S.C. 154(b) by 0 days.

(21) Appl. No.: 13/589,294

(22) Filed: Aug. 20, 2012

(65) Prior Publication Data
US 2013/0075989 A1  Mar. 28, 2013

(30) Foreign Application Priority Data

Sep. 23, 2011  (FR) ...................................... 11 58486
May 30, 2012  (FR) ...................................... 12 54945

(51) Int. Cl.
*B62B 3/04* (2006.01)
*B62B 3/10* (2006.01)

(52) U.S. Cl.
USPC ...... 280/35; 280/47.2; 280/47.131; 280/79.7; 414/10; 414/11; 414/490

(58) Field of Classification Search
CPC .................................... B62B 3/04; B62B 3/10
USPC .............. 280/35, 47.131, 47.28, 47.29, 47.2, 280/47.18, 79.7; 414/10, 11, 490
See application file for complete search history.

(56) References Cited

U.S. PATENT DOCUMENTS

| | | | | |
|---|---|---|---|---|
| 3,382,988 A | * | 5/1968 | O'Reilly | 414/11 |
| 3,850,441 A | * | 11/1974 | Peters et al. | 280/47.2 |
| 4,488,733 A | * | 12/1984 | Hellsten | 280/47.16 |
| 5,368,429 A | * | 11/1994 | Young | 414/11 |
| 5,568,848 A | * | 10/1996 | Liang | 190/18 A |
| 5,586,619 A | * | 12/1996 | Young | 187/226 |
| 5,765,843 A | * | 6/1998 | Miller | 280/79.7 |
| 5,947,491 A | * | 9/1999 | Meier | 280/47.2 |
| 5,984,605 A | * | 11/1999 | Young | 414/11 |
| 5,988,659 A | * | 11/1999 | Young | 280/79.7 |
| 6,241,447 B1 | * | 6/2001 | Echternacht | 414/11 |
| 6,244,810 B1 | * | 6/2001 | Reyes | 414/11 |
| 6,273,438 B1 | * | 8/2001 | Prapavat | 280/47.21 |
| 6,308,969 B1 | * | 10/2001 | Young | 280/79.7 |

(Continued)

OTHER PUBLICATIONS

Panellift® Model 439 Operator's Manual, © 2010, Telpro Inc., 7251 South 42$^{nd}$ Street, Grand Forks, ND 58201.*

*Primary Examiner* — Jeffrey J Restifo
*Assistant Examiner* — Steve Clemmons
(74) *Attorney, Agent, or Firm* — Heslin Rothenberg Farley & Mesiti P.C.

(57) ABSTRACT

The wheeled structure includes two connected sub-assemblies articulated relative to each other, with conversion capability between three wheels in a single plane for ground running operations, two main wheels for conveyance like a hand truck, or two secondary wheels for transverse positioning when fitting panels vertically. The first sub-assembly accommodates main wheels and secondary wheels and the second sub-assembly accommodates a pole, telescopic column assembly and support frame for the plates. The two sub-assemblies are rigidly connected by an assembly unit having an arm ending in a caster. The sub-assemblies, depending on their relative angular position, fulfill various vertical and horizontal panel fitting functions. The pole is mobile vertically relative to the main wheels, to the rear thereof when running on the ground, and to the fore thereof when fitting the panels vertically by lifting action on the first sub-assembly.

6 Claims, 6 Drawing Sheets

(56) References Cited

U.S. PATENT DOCUMENTS

Figure 9:
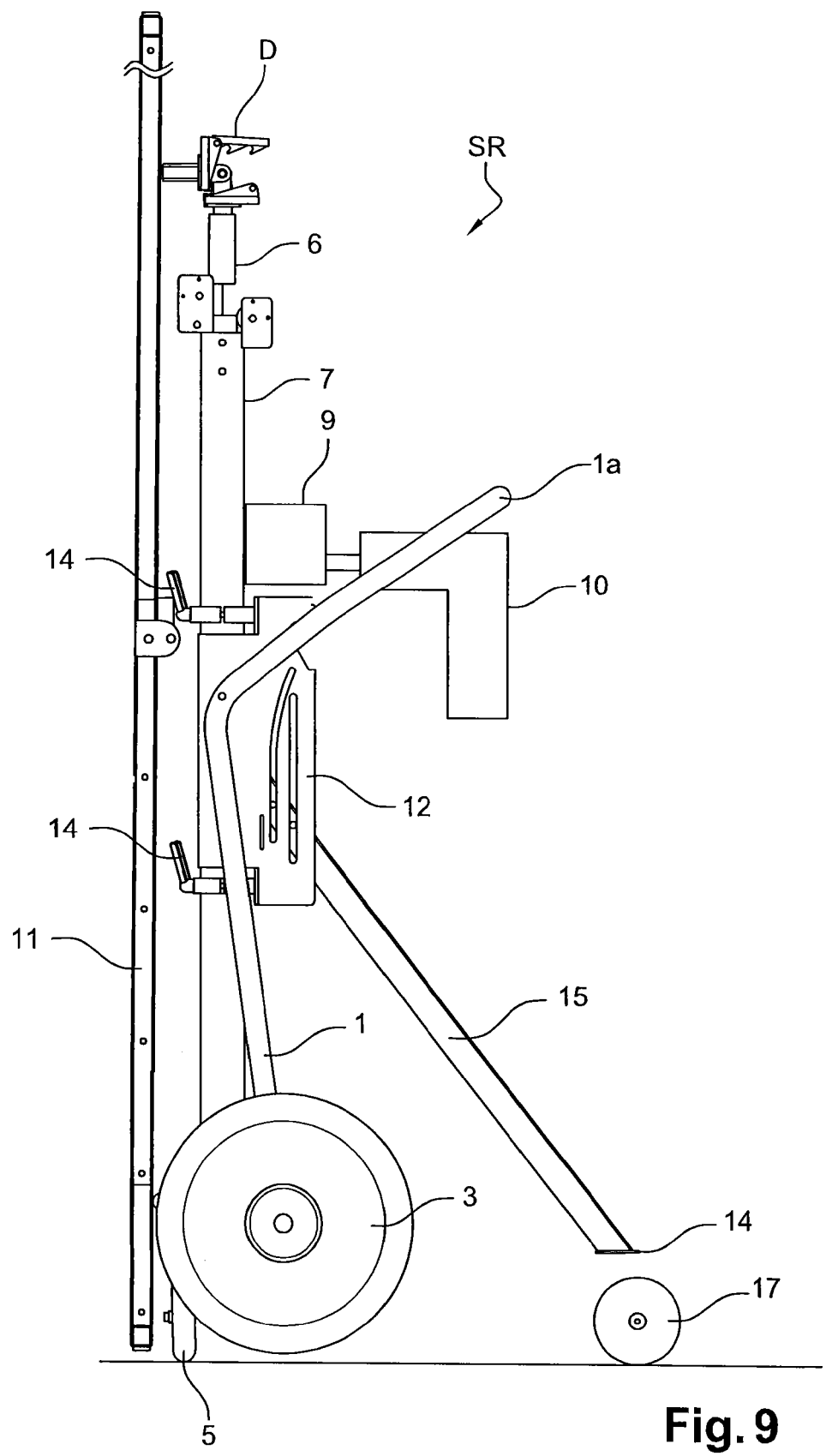

| | | | |
|---|---|---|---|
| 6,739,819 B2 * | 5/2004 | Caudill et al. | 414/11 |
| 7,219,903 B2 * | 5/2007 | Grooters et al. | 280/47.27 |
| 7,494,312 B2 * | 2/2009 | Valette et al. | 414/11 |
| 7,828,506 B1 * | 11/2010 | Young | 414/787 |
| 8,192,126 B1 * | 6/2012 | Young | 414/10 |
| 8,424,884 B1 * | 4/2013 | Nicol | 280/47.29 |
| 2001/0016156 A1 * | 8/2001 | Echternacht | 414/11 |
| 2003/0127834 A1 * | 7/2003 | Click | 280/651 |
| 2003/0194295 A1 * | 10/2003 | Caudill et al. | 414/11 |
| 2008/0187411 A1 * | 8/2008 | Young et al. | 414/11 |

* cited by examiner

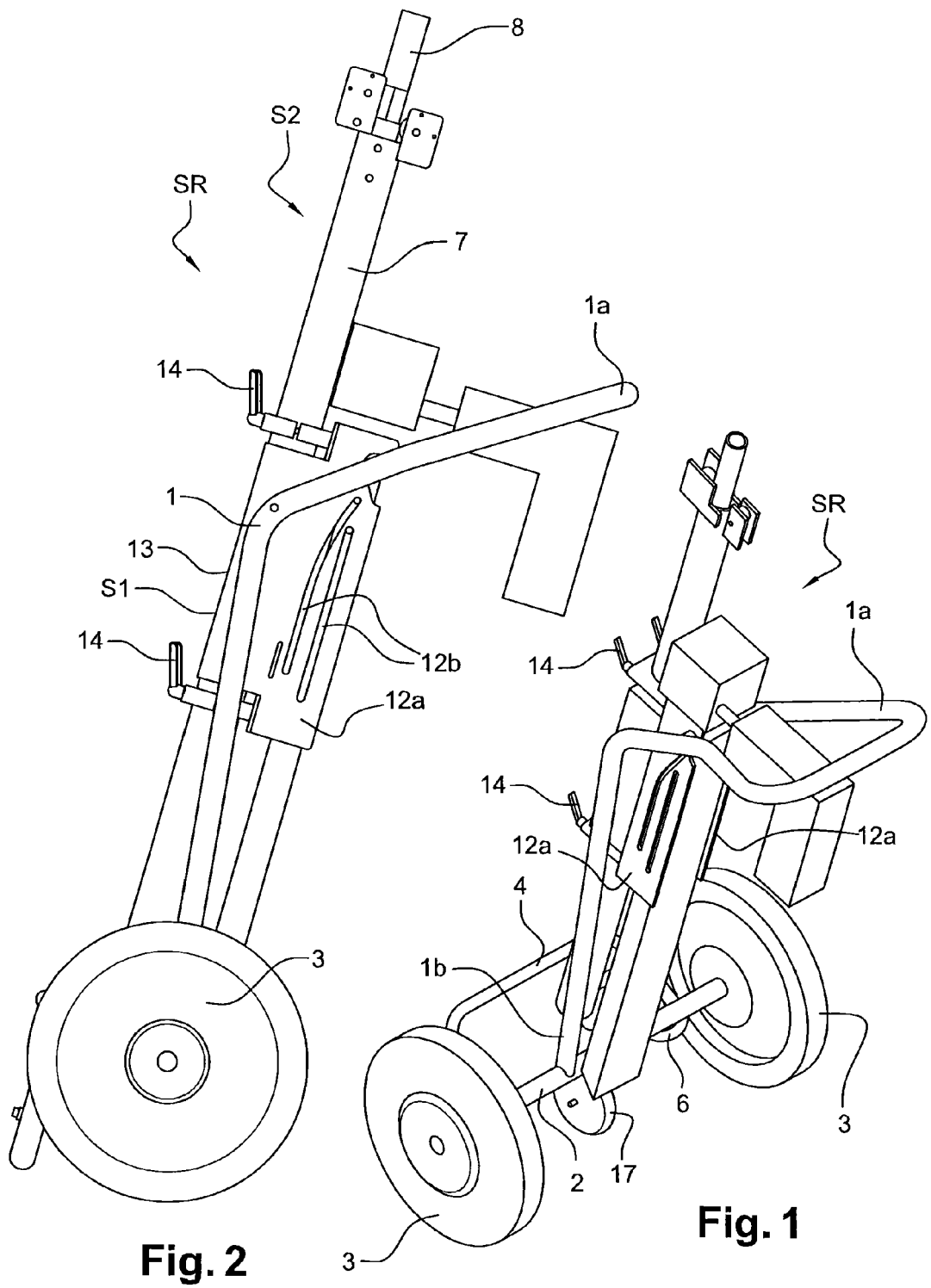

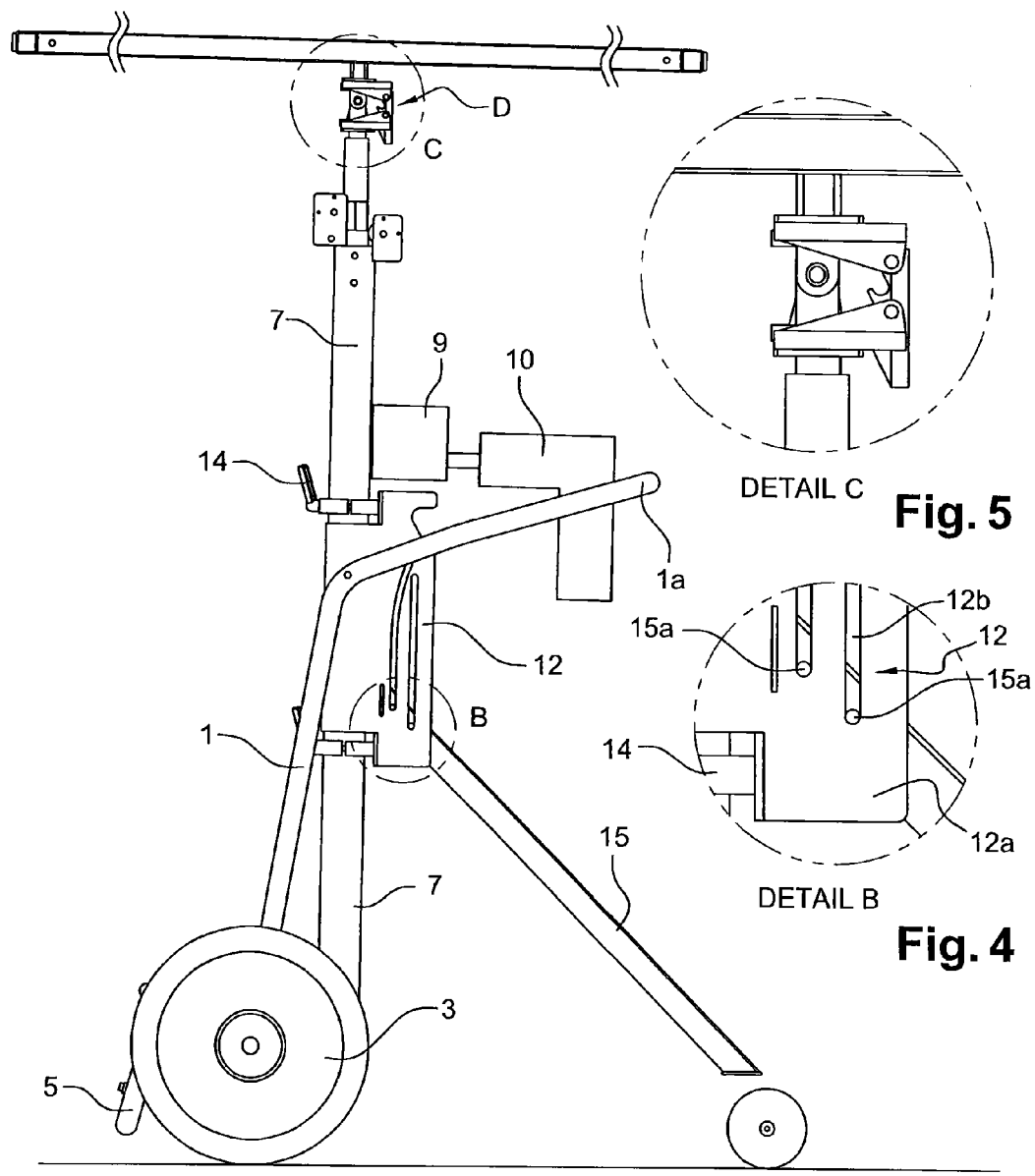

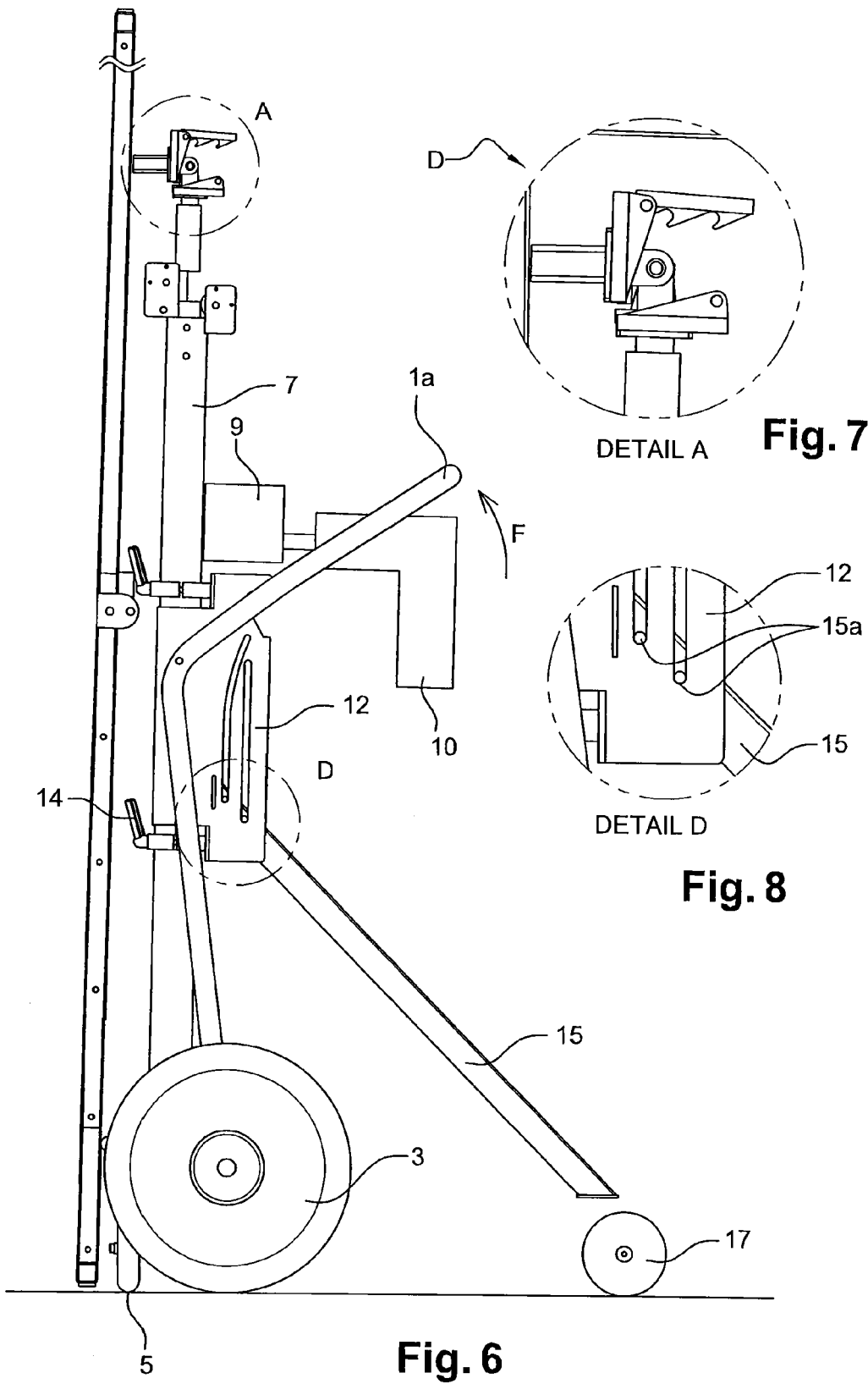

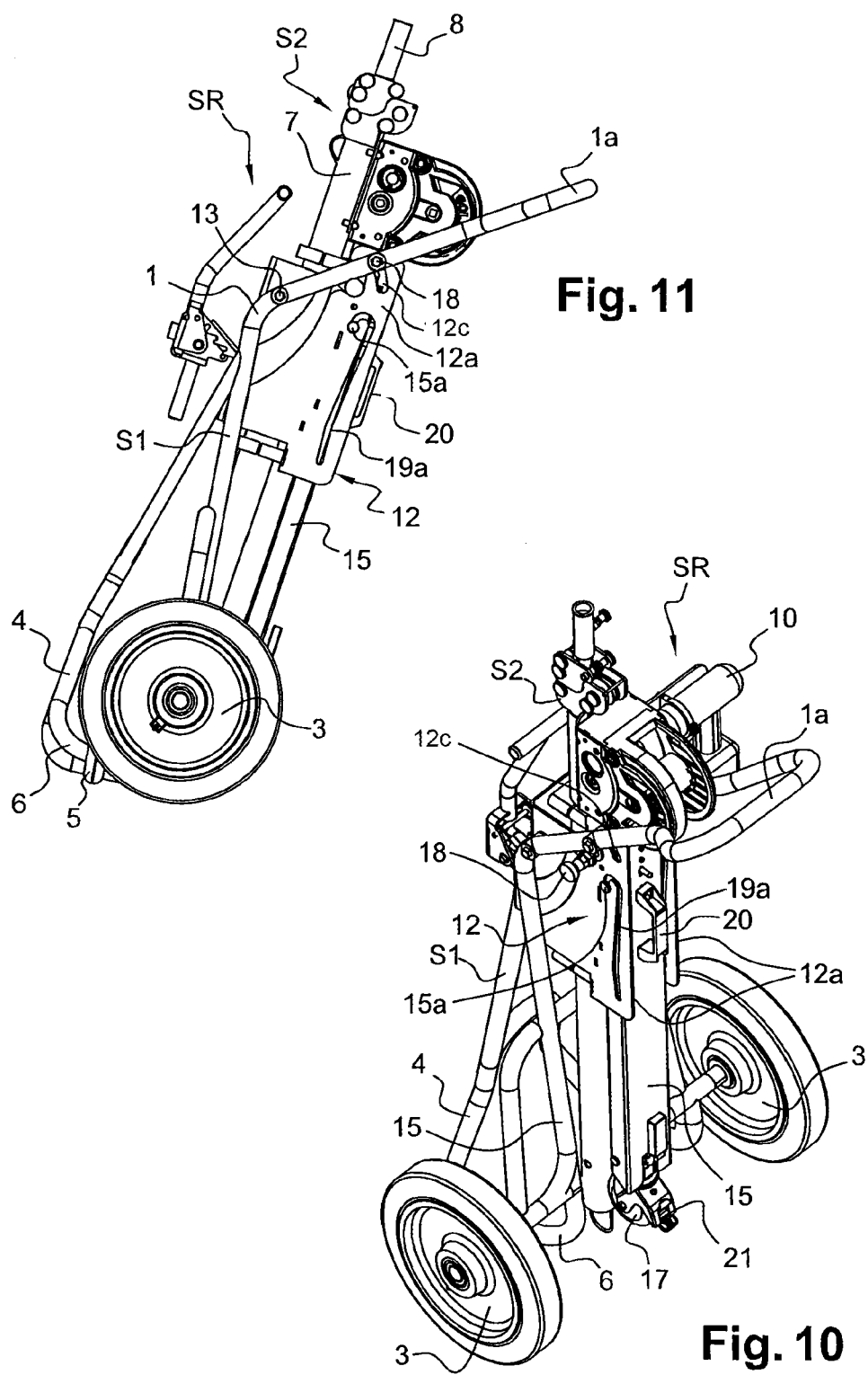

WHEELED STRUCTURE FOR HANDLING AND FITTING PANELS OR PLATES

CROSS REFERENCE TO RELATED APPLICATIONS

This application claims priority of French application no. 1158486 filed on Sep. 23, 2011 and French application no. 1254945 filed on May 30, 2012, the entire contents of both applications hereby incorporated by reference herein.

BACKGROUND ART

The invention relates to the technical field of plate-hoist type lifting and handling equipment for fitting large-size plates or panels to wall facings and/or ceilings in buildings, built structures and the like.

There are many known commercial manufacturers of this type of equipment, which, in the main, comprises a wheeled structure, with a stabilisation platform including 3 or 4 feet with running means, a pole with a set of telescopic columns nested one inside the other, and expanding under the action of a means activating a cable winch that enables said columns to expand. The upper column, in other words, the one intended to be at the highest point of the equipment under the ceiling, is arranged to accommodate a frame made from shaped elements for the accommodation, holding and presentation of plates and panels for fitting. This frame is pivotably arranged so that the plates or panels can be presented vertically or horizontally, to wall or ceiling.

Known equipment is reliable and some regard it as highly sophisticated.

However, there are some clear drawbacks, in particular in terms of the space it takes up, both in use or storage, and during handling. Moreover, it is not always easy to adjust in the transverse position when fitting plates or panels in a vertical plane and position adjustments remain tricky.

BRIEF SUMMARY OF THE INVENTION

The approach adopted by the Applicant has in fact been to reconsider the general design of this type of equipment seeking a simplified implementation that is practical to handle by the operator enabling him to set and adjust transverse positions, particularly when fitting panels or plates in a vertical plane.

According to a first feature, the wheeled structure for handling and fitting panels or plates of the type comprising a pole with a set of telescopic columns expanding under the action of a cable winch, the upper column intended to be at the highest point of the equipment under the ceiling being arranged to accommodate a frame made from shaped elements for the accommodation, holding and presentation of plates and panels for fitting, the frame being pivotably mounted relative to a support structure associated with said frame so that the plates or panels can be presented vertically or horizontally and engaging with said upper column, is remarkable in that said wheeled structure is arranged with two connected sub-assemblies articulated one relative to the other, and in that said wheeled structure has conversion capability so that it can be handled by an operator on three wheels in a single plane for ground running operations, on two main wheels so that it can be conveyed in the style of a hand truck, pushchair, wheeled luggage item, or from two secondary wheels so that the transverse position can be adjusted when fitting panels or plates vertically, and in that the first sub-assembly is arranged to accommodate main wheels and secondary wheels and the second sub-assembly to accommodate the pole accommodating the telescopic column assembly and support frame of the plates or panels for fitting, and in that the two first and second sub-assemblies are rigidly connected by an assembly unit starting from which an arm is placed including a caster, and in that the two sub-assemblies, depending on the relative angular position thereof, are used to fulfill the various vertical or horizontal panel and plate fitting functions, and in that the pole is mobile vertically relative to said main wheels, to the rear of thereof when running on the ground, and to the fore of said main wheels when fitting panels or plates vertically by lifting action on the first sub-assembly.

BRIEF DESCRIPTION OF DRAWING FIGURES

These characteristics and others will become clearer from the remainder of the description.

DETAILED DESCRIPTION

The object of the invention is set, as shown non-restrictively in the figure drawings wherein:

FIG. 1 is a perspective view of the wheeled structure for handling and fitting plates or panels according to the invention set in the conveying position, FIG. 2 is a side view of the wheeled structure as shown in FIG. 1, FIG. 3 is a side view of the wheeled structure according to the invention set in the position for changing plates or panels on a ceiling, FIG. 4 is a large-scale view of a detail (B) identified in FIG. 3, FIG. 5 is a large-scale view of a detail (C) identified in FIG. 3, FIG. 6 is a side view of the wheeled structure according to the invention set for presenting a plate or panel against a wall before final installation, FIG. 7 is a large-scale view of a detail A as shown in FIG. 6, FIG. 8 is a large-scale view of a detail D identified in FIG. 6, FIG. 9 is a side view of the wheeled structure according to the invention set for fitting a panel or plate vertically against a wall.

Figure 12:
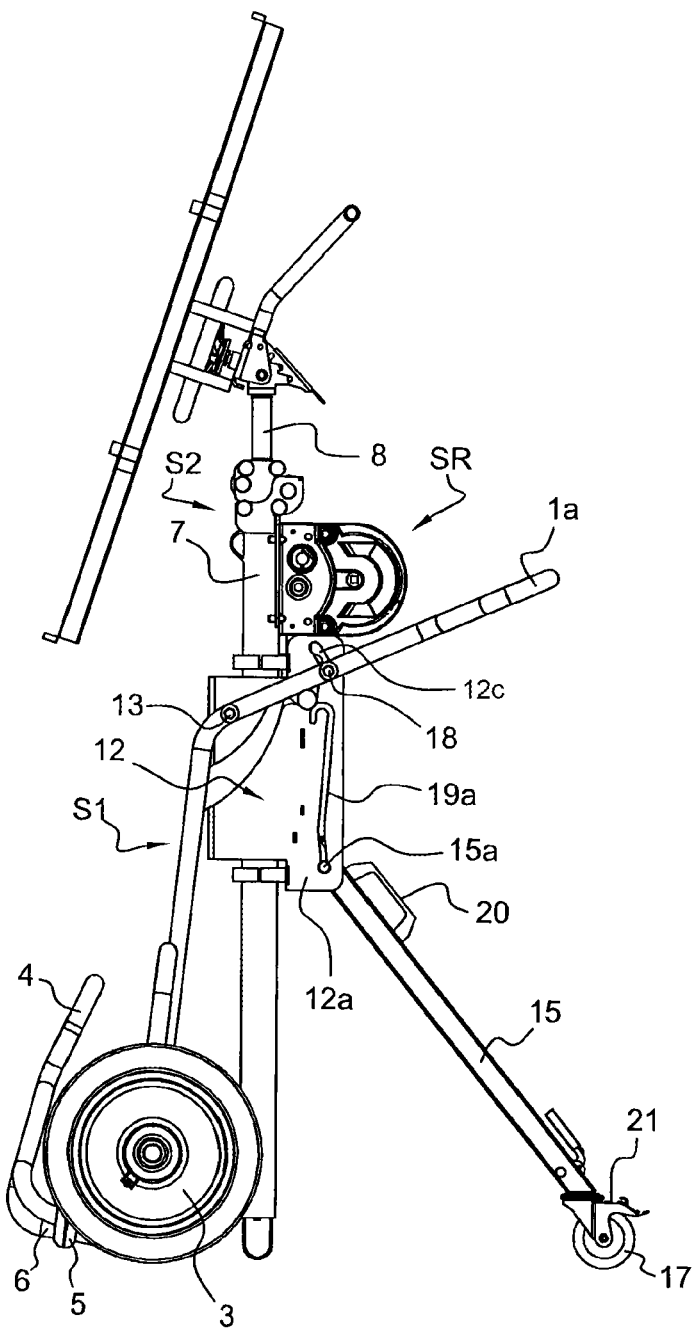

FIG. 10 is a perspective view of a variation of the wheeled structure for handling and fitting plates or panels according to the invention set in the conveying position, FIG. 11 is a side view of the variation of the wheeled structure as shown in FIG. 10, FIG. 12 is a side view of the variation of the wheeled structure according to the invention set in the position for changing plates or panels on a ceiling, To make the object of the invention more concrete, it will now be described non-restrictively as shown in the figure drawings.

The wheeled structure for handling and fitting panels or plates is referred to in its entirety as (SR). This wheeled structure is designed and arranged so as to allow plates or panels to be presented in a vertical plane against walls or in a horizontal plane for ceilings while having conversion capability so it can be handled by an operator on three wheels in a single plane for conventional ground running operations, but also on two main wheels so it can be conveyed in the style of a hand truck, pushchair, or movable luggage item, or have, based on two secondary wheels, the possibility of adjusting transverse position, when fitting panels or plates vertically.

In other words, the wheeled structure for handling and fitting panels or plates on walls and/or ceilings is designed to be of a very great manoeuvrability for the operator in all circumstances of use, and also to allow precise, fast and easy transverse adjustments so that plates or panels can be positioned vertically, in addition to its prime initial function for fitting plates or panels in the horizontal position.

Thus, according to the invention, the wheeled structure (SR) consists of two sub-assemblies (S1-S2) which are closely connected and articulated one relative to the other, and which, depending on the relative angular position thereof, can be used to provide the various functions of fitting panels and plates vertically to walls, horizontally to ceilings, and when being conveyed.

To be more specific, the first sub-assembly (S1) consists of a frame (1) made with two spaced apart and parallel tubular spars, the upper end (1a) of which is shaped and connected up to form a handle that can be gripped by the operator. The lower end (1b) of said spars is rigidly connected by any appropriate means to an axle (2) the ends of which bear the main wheels (3) of the wheeled structure (SR). These wheels (3), of large diameter, form the main running means of the wheeled structure, and particularly, at times of conveyance and handling. Additionally, said first sub-assembly includes in the front part thereof an added section (4) welded to the axle (2) to form a support platform for the plate or panel.

According to another essential characteristic of the invention, said first sub-assembly (S1) includes at the front a couple of secondary wheels (5) which are placed crosswise relative to the direction of movement of the wheeled structure. These secondary wheels (5), smaller in diameter than the main wheels, are mounted to the front of the wheeled structure, starting from shaped spars (6) secured to the axle (2) as shown in FIG. 1. This couple of secondary wheels is located in a plane substantially above the main wheel ground support and running plane.

The second sub-assembly (S2) includes a pole (7) of great height, hollow internally in order to accommodate a set of telescopic columns (8) which are capable of being deployed relative to one another by means of a known mechanism for this type of plate or panel lifting and handling equipment, namely, a winch (9) with a chain system, with one or more strands (not shown) and coupled in a known way to said columns. The winch (9) is itself activated by a power-driven means (10) which may be a portable electric tool supplied with 220 volts or on a battery, as shown diagrammatically in FIG. 2. In a known way, the upper column is arranged so as to accommodate a device (D), for holding and articulating an accommodation frame (11). This plate or panel accommodation frame (11) is designed in any way known in the state of the art, as is its articulation mechanism with position locking, either horizontally, or vertically.

The two sub-assemblies (S1-S2) are connected to one another by a unit forming a stirrup (12). This stirrup is arranged to enable the pivoting articulation of the sub-assembly (S1) relative to the second sub-assembly (S2) by means of a pivot pin (13) passing through the stirrup. This pivot pin (13) is provided and placed in the angled part of the frame (1) between the tubular spars and the grip handle-forming upper end thereof. Additionally, said stirrup is fixed in position using anchoring and locking means (14) enabling a secure assembly relative to the pole (7). These means (14) thus provide fixed height positioning of the sub-assembly (S1) relative to the sub-assembly (S2).

According to another arrangement, the stirrup (12) has spaced apart and parallel flanges (12a) which are provided with oblong apertures (12b). The pole (7) is arranged externally between said flanges with a clevis form which enables an arm (15) to be positioned by means of a hinge pin, said arm having at the end a caster (17). The arm (15) has lugs (15a) able to slide in apertures (12b) formed on the aforementioned flanges.

Thus, by referring to the various figure drawings, FIGS. 1 and 2 show the wheeled structure (SR) when being conveyed by the operator, the panel or plate accommodation frame having been removed. The arm (15) is pulled down against the pole. The wheeled structure is moved by the operator into a slanting position in the style of a hand truck, pushchair or movable luggage item, on the two main wheels which are alone in contact with the ground.

When fitting panels or plates to the ceiling, the wheeled structure is supported on the ground on three wheels, the two main wheels and the caster (17) associated with the arm (15). A means of locking the wheel or wheels in position may be actuated in a known way. The panel or plate support frame may be deployed at the required height by action on the winch via the power control.

When fitting panels or plates to the wall, two situations may however be distinguished for implementing the invention.

The first situation is that of moving the wheeled structure supported on three wheels, the main ones and the caster (17), near to the wall.

The second situation, for the operator, comprises pushing the wheeled structure in such a way that the panel or plate comes to a stop against the lower part of the wall or facing. The operator then swings the sub-equipment (S1) upwards by lifting the handle part in the direction of the arrow (F). The pole changes vertical position relative to the main wheels. The pole is mobile vertically relative to said main wheels, to the rear thereof (FIG. 3) when running on the ground, and to the front of said main wheels when fitting the panels or plates vertically by the action of lifting the handle part of the sub-assembly (S1). FIG. 6 shows the change of position from the pre-lifting position which has been carried out on the sub-assembly (S1) with the provisional and temporary contact of the main and secondary wheels simultaneously on the ground. The next action is a slight additional lifting (F1) of the handle part of the sub-assembly (S1) so that the wheeled structure is supported only on the secondary wheels. This causes the secondary wheels to be in contact with the ground to the detriment of the main wheels which become detached by a few millimeters or centimeters relative to the ground. It follows that the pole and the panel or plate are vertical, the panel or plate against the wall. The operator may then adjust as appropriate the positioning of the plate by a transverse movement of the wheeled structure using the secondary wheels. The panel or plate fitting may then be finalised.

The new design of the wheeled structure is therefore particularly straightforward and practical. Four possible positions are thus obtained, namely:

Foldaway position for conveyance (FIG. 1),
Plate or panel change and handling position (FIG. 3),
Presenting and fitting the plate against the wall,
Position of use of secondary wheels for transverse adjustment of the wheeled structure.

The advantages are clear from the description. Stress is laid on the ease of manoeuvrability of the wheeled structure, the properly adapted fitting in the vertical plane of the panels or plates without difficulty because of the adapted secondary running means, the small amount of space taken up by the wheeled structure as shown in FIG. 1.

According to a variation of the wheeled structure according to the invention in FIGS. 10 to 12, said wheeled structure for handling and fitting panels or plates is formed in the same way as previously by two subassemblies (S1-S2) which are closely connected and articulated one relative to the other, and which, depending on the relative angular position thereof, can be used to provide the various functions of fitting panels and plates vertically to walls, horizontally to ceilings, as well as the function of conveyance.

The first sub-assembly (S1) consists of a frame (1) made with two spaced apart and parallel tubular spars, the upper end (1a) of which is shaped and connected up to form a handle that can be gripped by the operator. The lower end (1b) of said spars is connected by any appropriate means to an axle (2) the ends of which bear the main wheels (3) of the wheeled structure (SR). These wheels (3), of large diameter, form the main running means of the wheeled structure, and particularly, at times of conveyance and handling. Additionally, said first sub-assembly (S1) includes in the front part thereof an added section (4), having a general form of a fender, welded to the axle (2) to form a support platform for the plate or panel.

Moreover, said first sub-assembly (S1) includes at the front a couple of secondary wheels (5) which are placed crosswise relative to the direction of movement of the wheeled structure. These secondary wheels (5), smaller in diameter than the main wheels, are mounted to the front of the wheeled structure, starting from shaped spars (6) secured to the axle (2), as shown in FIG. 1. This couple of secondary wheels (5) is located in a plane substantially above the main wheel (3) ground support and running plane.

In the same way as previously, the second sub-assembly (S2) includes a pole (7) of great height, hollow internally in order to accommodate a set of telescopic columns (8) which are capable of being deployed relative to one another by the aid of a winch (9) with a chain system, with one or more strands (not shown) and coupled in a known way to said columns. The winch (9) is itself activated by a power-driven means (10) which may be a portable electric tool supplied with 220 volts or on a battery, as shown diagrammatically in FIG. 10. In a known way, the upper column is arranged so as to accommodate a device (D), for holding and articulating an accommodation frame (11). This plate or panel accommodation frame (11) is designed in any way known in the state of the art, as is its articulation mechanism with position locking, either horizontally, or vertically.

Alternatively, and advantageously, the upper column of the pole (7) can receive an insulation unwinding frame or a small bucket capable of receiving rubble or suchlike, well known to a person skilled in the art, without departing from the scope of the invention.

The two sub-assemblies (S1-S2) are connected to one another by a unit forming a stirrup (12). This stirrup is arranged to enable the pivoting articulation of the sub-assembly (S1) relative to the second sub-assembly (S2) by means of a pivot pin (13) passing through the stirrup (12). This pivot pin (13) is provided and placed in the angled part of the frame (1) between the tubular spars and the grip handle-forming upper end thereof (1a).

The said stirrup (12) has spaced apart and parallel flanges (12a) the upper part of which is provided with oblong apertures (12c) receiving pins (18) connected to the middle part of the angled part of the frame (1) between the tubular spars and the grip handle-forming upper end thereof (1a). The pole (7) is arranged externally between said flanges (12a).

Moreover, the wheeled structure has an arm (15) provided at its proximal end with lugs (15a) sliding in apertures (19a) comprising a vertical part extending substantially from the lower edge of the flanges (12a) to the upper edge of said flanges (12a) and a curved part towards the front of the flanges (12a), and at its distal end a caster (17). In this way, the arm (15) is able to be moved from a foldaway position (FIGS. 10 and 11) to an active unfolded position (FIG. 12) in which the caster (17) is supported on the ground in order to ensure the stability of the wheeled structure according to the invention.

Advantageously, said arm (15) has a handle (20) facilitating the handling of said arm on folding it away and/or unfolding it as well as a brake (21) enabling the caster (17) to be locked.

Lastly, the examples given above are of course merely particular illustrations and are in no way limiting as regards the fields of application of the invention.

The invention claimed is:

1. Wheeled structure for handling and fitting panels or plates comprising a pole with a set of telescopic columns extending under action of a winch, an upper column accommodating a frame made from shaped elements for the accommodation, holding and presentation of plates and panels for fitting, the frame being pivotably mounted relative to a support structure associated with said frame so that the plates or panels can be presented vertically or horizontally and engaging with said upper column, first and second connected sub-assemblies articulated one relative to the other, and wherein said wheeled structure has conversion capability so that it can be handled by an operator on three wheels in a single plane for ground running operations, on two main wheels for conveyance, or from two secondary wheels so that a transverse position can be adjusted when fitting panels or plates vertically, the first sub-assembly being arranged to accommodate the main wheels and the secondary wheels and the second sub-assembly to accommodate the pole with the set of telescopic columns and the support frame for the plates or panels for fitting, the first and second sub-assemblies being rigidly connected by an assembly unit starting from which an arm is placed including a caster, the sub-assemblies depending on a relative angular position thereof, are used to fulfil various vertical and horizontal panel and plate fitting functions, and the pole is mobile relative to said main wheels, to the rear thereof when running on the ground, and to the fore of said main wheels when fitting the panels or plates vertically by lifting action on the first sub-assembly.

2. Wheeled structure as claimed in claim 1, wherein the first sub-assembly comprises a frame made with two spaced apart and parallel tubular spars, an upper end of is the spars being shaped and connected to form a handle that can be gripped by the operator, a lower end of said spars being rigidly connected to an axle, ends of the axle bearing the main wheels said first sub-assembly includes in a front part thereof an added section welded to the axle forming a support platform for the plate or panel, and said first sub-assembly includes at the front the secondary wheels placed crosswise relative to direction of movement of the main wheels.

3. Wheeled structure as claimed in claim 2, wherein the secondary wheels are smaller in diameter than the main wheels, and are mounted to the front of the wheeled structure, starting from shaped spars secured to the axle, and the secondary wheels are located in a plane substantially above a main wheel ground support and running plane.

4. Wheeled structure as claimed in claim 2, wherein the assembly unit connecting the first and the second sub-assemblies includes a stirrup, the stirrup is arranged to enable the first sub-assembly to articulate relative to the second sub-assembly via a pivot pin passing through the stirrup, the pivot pin is provided and placed in an angled part of the frame between the tubular spars and the grip handle-forming upper end thereof, said stirrup is secured in position using anchoring and locking means enabling a secure assembly relative to the pole, and the anchoring and locking means provide fixed height positioning of the first sub-assembly relative to the second sub-assembly.

5. Wheeled structure as claimed in claim 1, wherein the pole is hollow internally and accommodates the set of telescopic columns deployed relative to one another by a mechanism including the winch, the winch comprising a chain system winch, with one or more strands, and the winch is itself activated by a power-driven means.

6. Wheeled structure as claimed in claim 4, wherein the unit forming a stirrup has spaced apart and parallel flanges provided with oblong apertures, the pole is arranged externally between said flanges with a clevis which enables the arm to be positioned by a hinge pin, said arm having the caster at an end of the arm, and the arm has lugs that slide in the apertures of the flanges.

\* \* \* \* \*